US012264992B1

(12) United States Patent
Schroeder et al.

(10) Patent No.: US 12,264,992 B1
(45) Date of Patent: Apr. 1, 2025

(54) SYSTEMS AND METHODS FOR DETECTING CONDITIONS OF A FLUID CONDUIT

(71) Applicant: United Services Automobile Association (USAA), San Antonio, TX (US)

(72) Inventors: Eric David Schroeder, San Antonio, TX (US); Ashley Raine Philbrick, San Antonio, TX (US); Carlos J P Chavez, San Antonio, TX (US); Manfred Amann, San Antonio, TX (US); Donnette L. Moncrief Brown, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/955,963

(22) Filed: Sep. 29, 2022

Related U.S. Application Data

(60) Provisional application No. 63/249,916, filed on Sep. 29, 2021.

(51) Int. Cl.
*G01M 3/18* (2006.01)
*G01M 3/24* (2006.01)
*G01M 3/28* (2006.01)
*G08B 21/20* (2006.01)

(52) U.S. Cl.
CPC ............ *G01M 3/182* (2013.01); *G01M 3/243* (2013.01); *G01M 3/28* (2013.01); *G08B 21/20* (2013.01)

(58) Field of Classification Search
CPC ........ G01M 3/182; G01M 3/243; G01M 3/28; G08B 21/20
See application file for complete search history.

(56) References Cited

U.S. PATENT DOCUMENTS

| | | | |
|---|---|---|---|
| 6,175,310 B1 * | 1/2001 | Gott | G01M 3/165 73/40 |
| 7,828,299 B2 * | 11/2010 | van Schoor | F16J 15/445 277/556 |
| 10,234,350 B1 | 3/2019 | Schroeder et al. | |
| 10,502,654 B1 | 12/2019 | Schroeder et al. | |
| 10,837,861 B1 | 11/2020 | Schroeder et al. | |
| 11,193,852 B1 | 12/2021 | Schroeder et al. | |

(Continued)

FOREIGN PATENT DOCUMENTS

CA 2827826 A1 3/2014

*Primary Examiner* — Farhana A Hoque
*Assistant Examiner* — Joseph O Nyamogo
(74) *Attorney, Agent, or Firm* — Fletcher Yoder P.C.

(57) ABSTRACT

A system configured to monitor a condition of a fluid conduit includes a leak detection sensor assembly having a first electrical conductor and a second electrical conductor positioned on the fluid conduit. The system also includes one or more additional sensor assemblies positioned on the fluid conduit. The system further includes a controller configured to determine a presence of a leak along the fluid conduit in response to a resistance of a leak detection electrical circuit formed by the first electrical conductor and the second electrical conductor indicating that the leak detection electrical circuit is closed and data from the one or more additional sensor assemblies indicating the presence of the leak along the fluid conduit.

20 Claims, 3 Drawing Sheets

(56) References Cited

U.S. PATENT DOCUMENTS

| | | |
|---|---|---|
| 2004/0226386 A1 | 11/2004 | Gysling et al. |
| 2005/0138990 A1 | 6/2005 | Phillips et al. |
| 2005/0255724 A1 | 11/2005 | Picco et al. |
| 2012/0278018 A1 | 11/2012 | Hastreiter |
| 2015/0300164 A1* | 10/2015 | Frey ................ E21B 47/135 |
| | | 73/152.18 |
| 2016/0356668 A1* | 12/2016 | Remes ................ G01M 15/02 |
| 2017/0089496 A1* | 3/2017 | Lennon ................ F16L 13/146 |
| 2019/0390990 A1* | 12/2019 | Krywyj ................ G01N 29/041 |
| 2020/0018662 A1* | 1/2020 | Hawwa ................ G01M 3/36 |

* cited by examiner

SYSTEMS AND METHODS FOR DETECTING CONDITIONS OF A FLUID CONDUIT

CROSS-REFERENCE TO RELATED APPLICATION

The present application claims priority to and the benefit of U.S. Provisional Application No. 63/249,916, entitled "SYSTEMS AND METHODS FOR DETECTING CONDITIONS OF A FLUID CONDUIT" and filed on Sep. 29, 2021, the disclosure of which is incorporated by reference herein in its entirety for all purposes.

BACKGROUND

The present disclosure relates generally to systems and methods for detecting conditions of a fluid conduit. More specifically, the present disclosure relates to techniques for detecting leaks along the fluid conduit.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Fluid conduits (e.g., tubes, pipes, hoses) may be used to connect various types of equipment to a fluid supply and/or to a fluid outlet. For example, one conduit may connect a faucet of a sink to a municipal water supply and another conduit may connect a drain of the sink to a municipal sewer system. Such fluid conduits may bend, leak, and/or burst during operation and/or over time.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a system configured to monitor a condition of a fluid conduit includes a leak detection sensor assembly having a first electrical conductor and a second electrical conductor positioned on the fluid conduit. The system also includes one or more additional sensor assemblies positioned on the fluid conduit. The system further includes a controller configured to determine a presence of a leak along the fluid conduit in response to a resistance of a leak detection electrical circuit formed by the first electrical conductor and the second electrical conductor indicating that the leak detection electrical circuit is closed and data from the one or more additional sensor assemblies indicating the presence of the leak along the fluid conduit.

In one embodiment, a system configured to monitor multiple fluid conduits associated with a structure includes multiple sensor assemblies positioned on the multiple fluid conduits, wherein the multiple sensor assemblies include one or more strain gauges. The system also includes a controller configured to determine a presence of a leak along the multiple fluid conduits based on data from the multiple sensor assemblies. The controller is also configured to, in response to determining the presence of the leak, provide an output to a display screen, a speaker, a valve, or any combination thereof.

In one embodiment, a method of monitoring a condition of a fluid conduit includes receiving, at one or more processors, data from one or more strain gauges positioned on the fluid conduit. The method also includes determining, using the one or more processors, a presence of a leak or a failure condition along the fluid conduit based on data from the one or more strain gauges. The method further includes instructing, using the one or more processors, an output via to a display screen, a speaker, a valve, or any combination thereof in response to determining the presence of the leak or the failure condition.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
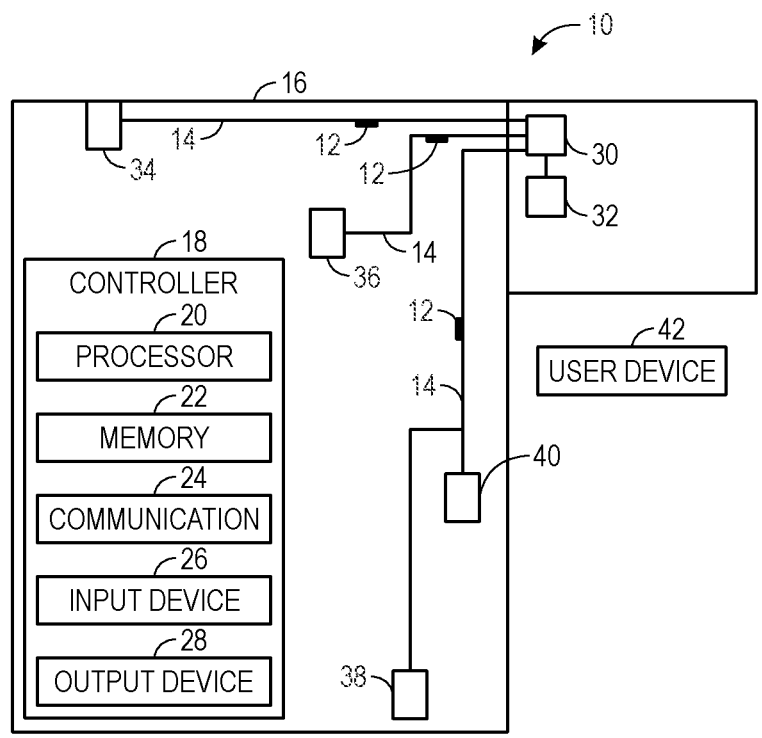
FIG. 1 illustrates a schematic diagram of a fluid conduit monitoring system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Fluid conduits (e.g., tubes, pipes, hoses) may be used to connect various types of equipment to a fluid supply and/or to a fluid outlet. For example, a building may include multiple different fluid conduits to connect a fluid supply, such as a municipal water supply or a water well, to appliances, sinks, showers, bathtubs, outdoor spigots, sprinkler heads, or the like. As another example, a vehicle may include multiple different fluid conduits to connect a fluid supply to an engine, a radiator, pneumatically or hydraulically driven equipment, or the like.

In operation, fluid conduits may be exposed to various environmental conditions and/or have construction features (e.g., materials; connections) that may cause the fluid conduits to wear over time and/or to leak. Accordingly, the disclosed embodiments relate to a fluid conduit monitoring system that includes one or more sensor assemblies configured to monitor respective conditions of one or more fluid conduits. For example, a sensor assembly may include multiple conductive wires that extend along a fluid conduit, and fluid that leaks from the fluid conduit may extend between the conductive wires to form a short circuit that is detected by a controller (e.g., hub device). As another example, a sensor assembly may include one or more strain gauges that are distributed along a fluid conduit, and the one or more stain gauges may detect bending of the fluid conduit that precedes a leak or a rupture in the fluid conduit. Early detection and communication of issues such as these may allow for efficient repair of conduit and limit overall costs (e.g., costs associated with larger problems caused by long term fluid leaks). These sensors may communicate to property owners, maintenance personnel, insurance providers, and the like. Detecting and communicating leaks or areas with high potential for leaking may provide numerous efficiencies.

The fluid conduit monitoring system may include various other features, such as a manifold that monitors and adjusts fluid flow through multiple fluid conduits. The controller may utilize data from multiple sensor assemblies along the multiple fluid conduits to control valves at the manifold to adjust the fluid flow through the multiple fluid conduits. The controller may also provide, and/or instruct another suitable device (e.g., the manifold; a user device, such as a mobile phone) to provide, audible and/or visible alerts. Alerts may be transmitted via networks to remote monitors (e.g., a maintenance company).

The fluid conduits may be configured to support any of a variety of fluids (e.g., water, hydraulic fluid, steam, fuel, coolant, air or other gases). Additionally, the fluid conduits disclosed herein may be rigid or flexible conduits formed from any of a variety of materials (e.g., metals, including metal alloys; polyvinyl chloride [PVC]; cross-linked polyethylene [PEX]; fabric, including coated fabric; rubber or other elastomers).

By way of introduction, FIG. 1 is a schematic diagram of an embodiment of a fluid conduit monitoring system 10 (e.g., leak detection system). As shown, the fluid conduit monitoring system 10 includes multiple sensor assemblies 12 that are configured to monitor a condition of multiple fluid conduits 14 (e.g., tubes, pipes, hoses) associated with a structure 16 (e.g., building or vehicle). However, it should be appreciated that the fluid conduit monitoring system 10 may also include any number of sensor assemblies 12 (e.g., 1, 2, 3, 4, 5, or more) that monitor a condition of any number of fluid conduits 14 (e.g., 1, 2, 3, 4, 5, or more) in any environment (e.g., other than the structure 16).

The fluid conduit monitoring system 10 includes a controller 18 (e.g., hub device; electronic controller) that includes a processor 20, a memory device 22, a communication device 24, an input device 26 (e.g., touchscreen; button; switch), and/or an output device 28 (e.g., display; speaker). The controller 18 may be located at the structure 16 and may operate as a hub device that collects and analyzes data from the sensor assemblies 12. The controller 18 may also provide one or more outputs based on the data. For example, if the data indicates a leak along one of the fluid conduits 14, the controller 18 may provide an audible and/or a visible alert via the output device 28 to notify a user of the leak. It should be appreciated that the controller 18 may also operate as a multi-functional hub device that collects and analyzes data from one or more other types of sensor assemblies (e.g., imaging sensors, smoke detectors, other leak detectors) to monitor and provide alerts related to other conditions (e.g., break-ins, fires, floods) at the structure 16.

In some embodiments, the fluid conduit monitoring system 10 includes a manifold 30 (e.g., fluid control device). The manifold 30 may include one or more valves that adjust fluid flow from a fluid supply 32 to the multiple fluid conduits 14, which extend to various components within the structure 16. For example, a first valve may adjust the fluid flow through a first fluid conduit 14 that extends to a first component 34 (e.g., a hot water tank), a second valve may adjust the fluid flow through a second fluid conduit 14 that extends to a second component 36 (e.g., a washing machine), and a third valve may adjust the fluid flow through a third fluid conduit 14 that splits to a third component 38 (e.g., a shower) and a fourth component 40 (e.g., a sink).

It should be appreciated that the multiple fluid conduits 14 and the manifold 30 may have any of a variety of configurations to deliver the fluid to the various components within the structure 16. Indeed, each valve may adjust the fluid flow to one or more components (e.g., a hot water tank, a washing machine, a dishwasher, a sink, a shower) in one or more regions (e.g., rooms, sections) of the structure 16. The controller 18 may provide control signals to the one or more valves to adjust the fluid flow through the multiple fluid conduits 14. For example, if the data indicates a leak along the first fluid conduit that extends to the first component 34, the controller 18 may close the first valve to block the fluid flow through the first fluid conduit to the first component 34.

In some embodiments, the controller 18 may be configured to communicate with a user device 42 (e.g., mobile phone) via a network (e.g., Internet, 5G, Bluetooth). For example, the controller 18 may provide an output that causes the audible and/or visible alerts to be presented via the user device 42. It should be appreciated that any of the features, operations, and/or functions disclosed herein may be distributed between the controller 18, the user device 42, and/or any other processing components in any suitable manner. Furthermore, the controller 18 may include or be part of a distributed controller with processing components located at the structure 16 and/or remote from the structure (e.g., in the cloud). For example, each sensor assembly 12 (or a group of sensor assemblies 12) may be associated with its own sensor controller with its own processing components that collect and analyze data, as well as provide a respective output based on the data. Then, each sensor controller may communicate with a central controller for the structure 16 to facilitate data aggregation from multiple different sensor assemblies 12 and advanced monitoring functions, such as assessing an overall condition of all of the fluid conduits 14 at the structure 16. In such cases, the various operations disclosed herein may be distributed between the sensor controller(s), the central controller, and/or other processing components (e.g., in the cloud). Additionally, it should be appreciated that the senor assemblies 12, the manifold 30, and the controller 18 may be communicatively coupled via wired or wireless connections. For example, each sensor assembly 12 may include a communication device (e.g., a transceiver or a transmitter) to provide data to the controller 18 via a wireless connection.

The processor 20 disclosed herein may be any type of computer processor or microprocessor capable of executing computer-executable code. The processor 20 may also include multiple processors that may perform the operations provided herein. The memory device 22 may be any suitable article of manufacture that can serve as media to store processor-executable code, data, or the like. These articles of manufacture may represent computer-readable media (e.g., any suitable form of memory or storage) that may store the processor-executable code used by the processor 20 to perform the presently disclosed techniques. The memory device 22 may represent non-transitory computer-readable media (e.g., any suitable form of memory or storage) that may store the processor-executable code used by the processor 20 to perform various techniques described herein. It should be noted that non-transitory merely indicates that the media is tangible and not a signal.

Figure 2:
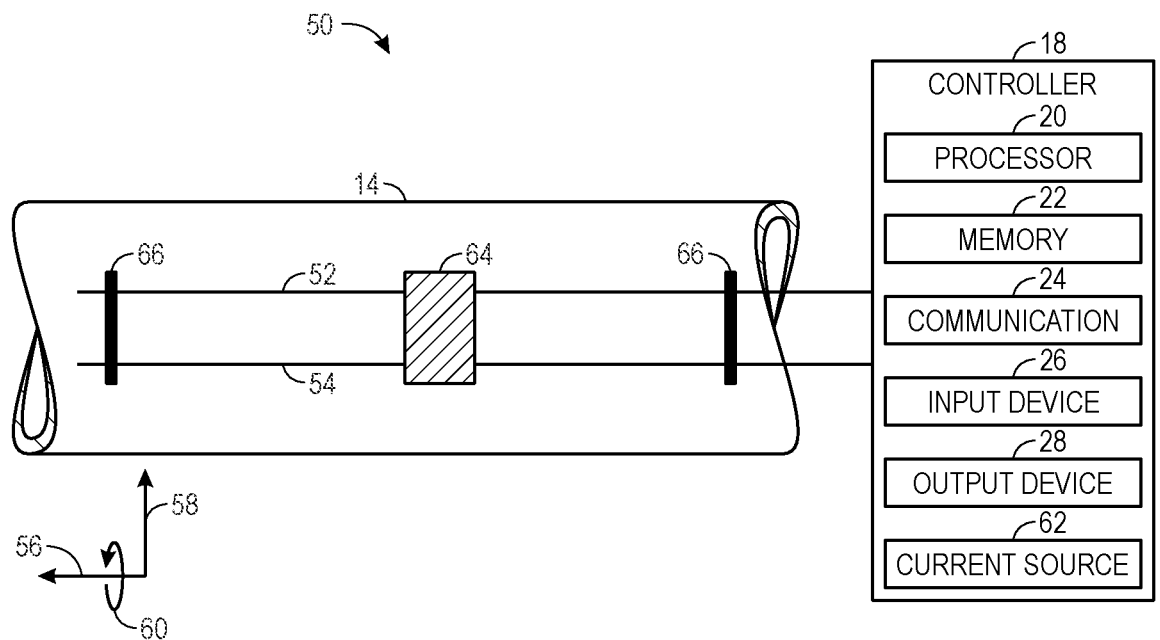
FIG. 2 illustrates a perspective view of a sensor assembly that may be utilized in the fluid conduit monitoring system of FIG. 1, wherein the sensor assembly includes conductive elements that extend along a fluid conduit, in accordance with embodiments described herein.

With the foregoing in mind FIGS. 2-7 illustrate various types of the sensor assemblies 12 that may be utilized as part of the fluid conduit monitoring system 10 of FIG. 1. In particular, FIG. 2 illustrates a perspective view of a sensor assembly 50 (e.g., conductive wire sensor assembly; leak detection sensor assembly) that may be utilized in the fluid conduit monitoring system 10 of FIG. 1, wherein the sensor assembly 50 includes a first conductive element 52 (e.g., pad, wire, wire mesh) and a second conductive element 54 (e.g., pad, wire, wire mesh), in accordance with embodiments described herein.

To facilitate discussion the fluid conduit 14 and other components may be described with reference to a longitudinal axis or direction 56, a radial axis or direction 58, and a circumferential axis or direction 60. As shown, the first conductive element 52 and the second conductive element 54 are positioned on an outer wall (e.g., radially-outer wall; exterior surface) of the fluid conduit 14 and extend in the longitudinal direction 56 along the fluid conduit 14. The first conductive element 52 and the second conductive element 54 are spaced apart from one another along the circumferential axis 60. While the first conductive elements 52 and the second conductive elements 54 are illustrated as straight wires, it should be appreciated that the first and second conductive elements 52, 54 may have a wavy or serpentine shape. Additionally, more than two conductive elements 52 may be provided and spaced apart along the circumferential axis 60.

The first and second conductive elements 52, 54 may be deposited or printed onto the fluid conduit 14. The first and second conductive elements 52, 54 may be coupled to the fluid conduit 14 via adhesives or other fasteners that enable efficient retrofitting (e.g., application to the fluid conduit 14 that is already installed to support a fluid flow). The sensor assembly 50 may include a housing 66 (e.g., frame, body) that supports the first and second conductive elements 52, 54 and that facilitates coupling the first and second conductive elements 52, 54 to the fluid conduit 14. The housing 66 may have any suitable form, such as one or more brackets with adhesive strips that adhere to the fluid conduit 14, one or more hinged clamps (e.g., annular clamps) that clamp onto the fluid conduit 14, or the like. For example, the sensor assembly 50 may have or be used in conjunction with any of the features of various sensor assemblies and systems disclosed in U.S. Pat. No. 10,502,654, which is hereby incorporated by reference in its entirety.

In operation, current (e.g., electrical current) may flow from a current supply 62 to the first conductive element 52. Without a leak in the fluid conduit 14, the sensor assembly 50 is in an open configuration (e.g., forms an open electrical circuit, which may also be referred to as an open leak detection circuit). However, with a leak in the fluid conduit 14, the fluid from the fluid conduit 14 may extend between and electrically connect the first conductive element 52 and the second conductive element 54. Thus, with the leak in the fluid conduit 14, the sensor assembly 50 may be in a closed configuration (e.g., forms a closed electrical circuit, which may also be referred to as a closed, continuous, or complete leak detection circuit). In particular, the current may flow from the current supply 62 to the first conductive element 52, from the first conductive element 52 to the second conductive element 54 via the fluid, and then from the second conductive element 54 to the controller 18.

In some embodiments, the sensor assembly 50 may include one or more fluid-absorbing members 64 (e.g., foam, fabric, polymer) that extend in the circumferential direction 60 about at least a portion of the fluid conduit 14 to overlap with the first conductive element 52 and the second conductive element 54. The one or more fluid-absorbing members 64 may be positioned over (e.g., to cover) and/or under (e.g., between the outer wall of the fluid conduit 14 and the first and second conductive elements 52, 54) the first and second conductive elements 52, 54. The one or more fluid-absorbing members 64 may absorb the fluid that leaks from the fluid conduit 14 and may enable the fluid to electrically connect the first and second conductive elements 52, 54. Although one fluid-absorbing member 64 is shown in FIG. 2, it should be appreciated that multiple fluid-absorbing members 64 may be spaced apart along the longitudinal axis 56. Furthermore, the one or more fluid-absorbing members 64 may have other shapes, such as extending along an entire length of the first and second conductive elements 52, 54. In some embodiments, the housing 66 may support the one or more fluid-absorbing members 64. For example, the housing 66 may be positioned over (e.g., to cover; clamp around) the one or more fluid-absorbing members 64 to hold the one or more fluid-absorbing members 64 against the fluid conduit 14, for example.

In any case, the processor 20 is configured to detect completion of the electrical circuit (e.g., based on a measured resistance through the electrical circuit; via detection of a measured resistance that meets or exceeds a threshold resistance). For example, infinite resistance through the electrical circuit indicates that the electrical circuit is open, that there is insufficient fluid absorbed by the fluid-absorbing member 64 to close the electrical circuit, and/or that no significant leaks are present proximate to the sensor assembly 50. However, when the measured resistance meets or exceeds the threshold resistance, this indicates that the electrical circuit is closed, that there is sufficient fluid outside of the fluid conduit 14 to close the electrical circuit, and/or that significant leaks are present proximate to the sensor assembly 50. The processor 20 is configured to provide an indication of the leak or other fluid presence to a user, such as via the output device 28. For example, in response to detection of the closed electrical circuit, the output device 28 may be a speaker that provides an audible alert (e.g., an alarm), a light emitter that provides a visible alert (e.g., illuminates or turns on), and/or a display screen that provides a visible alert (e.g., a text message).

Figure 3:
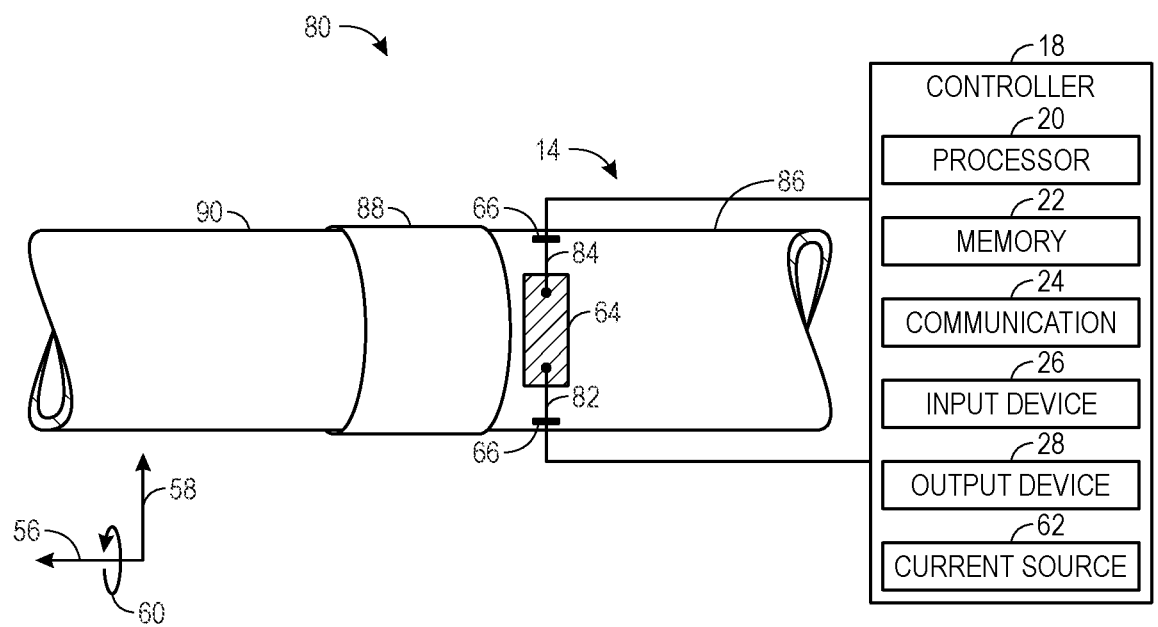
FIG. 3 illustrates a perspective view of a sensor assembly that may be utilized in the fluid conduit monitoring system of FIG. 1, wherein the sensor assembly includes conductive elements that extend circumferentially around a fluid conduit, in accordance with embodiments described herein.

FIG. 3 illustrates a perspective view of a sensor assembly 80 (e.g., conductive wire sensor assembly; leak detection sensor assembly) that may be utilized in the fluid conduit monitoring system 10 of FIG. 1, wherein the sensor assembly 80 includes a first conductive element 82 and a second conductive element 84, in accordance with embodiments described herein. The sensor assembly 80 of FIG. 3 may have any of the features of the sensor assembly 50 of FIG. 2 (e.g., may include the fluid-absorbing member 64 and/or the housing 66); however, an arrangement of parts of the sensor assembly 80 of FIG. 3 may be different than an arrangement of parts of the sensor assembly 50 of FIG. 2. To facilitate discussion the fluid conduit 14 and other components may be described with reference to the longitudinal axis or direction 56, the radial axis or direction 58, and the circumferential axis or direction 60.

As shown, the first conductive element 82 and the second conductive element 84 are positioned on an outer wall (e.g., radially-outer wall; exterior surface) of the fluid conduit 14 and extend along the circumferential axis 60 about the fluid conduit 14, but are separated from one another by a gap along the circumferential axis 60. The first and second conductive elements 82, 84 may be deposited or printed onto the fluid conduit 14. The first and second conductive elements 82, 84 may be coupled to the fluid conduit 14 via adhesives or other fasteners that enable efficient retrofitting (e.g., application to the fluid conduit 14 that is already installed to support a fluid flow).

Indeed, the configuration of the sensor assembly 80 may be particularly useful for retrofitting at connections between segments of the fluid conduit 14. As shown, the first and second conductive elements 82, 84 are positioned adjacent to a connection between a first segment 86 and a second segment 88 of the fluid conduit 14. The second segment 88 may be a connector piece that is used to repair a prior leak in the fluid conduit 14, such as by cutting the first segment 86 and a third segment 90, and then inserting the second segment 88. As part of the repair process, the sensor assembly 80 may be added to enable the user to confirm successful repair of the leak and to monitor for future leaks. Although the sensor assembly 80 is shown as being positioned at the connection between the first segment 86 and the second segment 88, it should be appreciated that one or more sensor assemblies 80 may be positioned at any of a variety of locations along the fluid conduit 14. For example, an additional sensor assembly 80 may be positioned at the connection between the second segment 88 and the third segment 90.

In operation, current (e.g., electrical current) may flow from the current supply 62 to the first conductive element 82. Without a leak in the fluid conduit 14, the sensor assembly 80 is in an open configuration (e.g., forms an open electrical circuit, which is also referred to herein as an open leak detection circuit). However, with a leak in the fluid conduit 14, the fluid from the fluid conduit 14 may extend between and electrically connect the first conductive element 82 and the second conductive element 84. Thus, with the leak in the fluid conduit 14, the sensor assembly 80 may be in a closed configuration (e.g., forms a closed electrical circuit, which is also referred to herein as a closed, continuous, or complete leak detection circuit). In particular, the current may flow from the current supply 62 to the first conductive element 82, from the first conductive element 82 to the second conductive element 84 via the fluid, and then from the second conductive element 84 to the controller 18. The processor 20 is configured to detect completion of the electrical circuit and to provide an indication of the leak or fluid presence to a user, such as via the output device 28.

In some embodiments, the sensor assemblies 50, 80 (or at least the fluid-absorbing member 64) may be positioned at a bottom of the conduit (e.g., relative to a gravity vector) to facilitate collection or travel of the fluid near the sensor assemblies 50, 80 (or at least at the fluid-absorbing member 64). It should be appreciated that the sensor assemblies 50, 80 in FIGS. 2 and 3 may be configured in other ways. For example, the first and second electrical conductive elements 52, 54 or the first and second electrical conductive elements 82, 84 may be connected to one another to form a closed electrical circuit, and current from the current supply 62 may be routed through the closed electrical circuit (e.g., continuously or periodically). Then, a rupture of the fluid conduit 14 may break the closed electrical circuit, which may be detected by the controller 18 based on a change in resistance. Additionally, it should be appreciated that regardless of whether the sensor assemblies 50, 80 form an open electrical circuit or a closed electrical circuit as a default (e.g., in the absence of the fluid or the rupture), the change in resistance and/or signal induced by the leak and/or the rupture may enable the controller 18 to identify an approximate location of the leak and/or the rupture along the fluid conduit 14.

Figure 4:
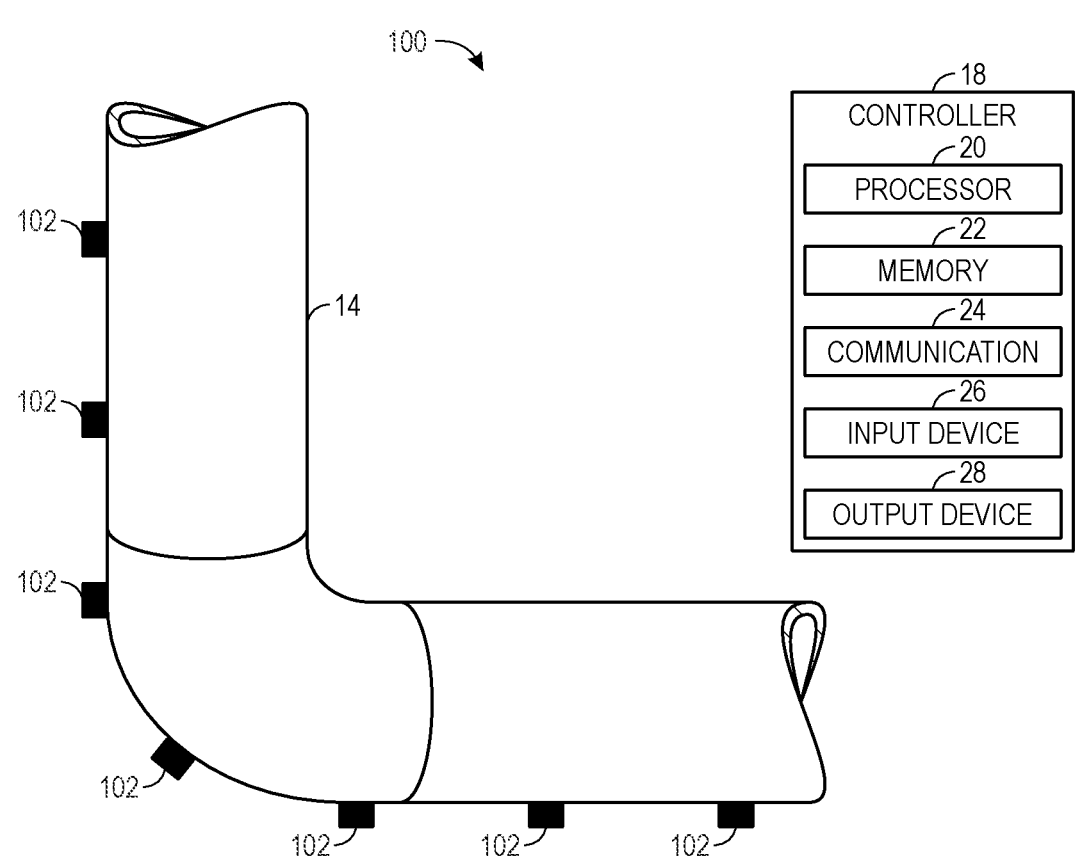
FIG. 4 illustrates a perspective view of a sensor assembly that may be utilized in the fluid conduit monitoring system of FIG. 1, wherein the sensor assembly includes strain gauges positioned along a fluid conduit, in accordance with embodiments described herein.

FIG. 4 illustrates a perspective view of a sensor assembly 100 that may be utilized in the fluid conduit monitoring system 10 of FIG. 1, wherein the sensor assembly 100 includes multiple strain gauges 102 positioned along the fluid conduit 14, in accordance with embodiments described herein. The fluid conduit 14 may bend or experience changes in strain (e.g., certain changes or patterns of changes) under certain operating conditions, such as during temporary surges in fluid pressure, upon freezing and expansion of the fluid within the fluid conduit 14, upon leak or rupture of the fluid conduit 14, or the like.

In operation, the one or more strain gauges 102 may detect the strain along the fluid conduit 14 and may provide data indicative of the strain to the controller 18. The processor 20 may process the data to determine the strain (e.g., calculate a strain measurement) along the fluid conduit 14 and to provide various outputs based on the strain along the fluid conduit 14. In some embodiments, the processor 20 may compare the strain to a threshold strain and then provide an audible and/or a visible alert in response to the strain meeting or exceeding the threshold strain. For example, the controller 18 may provide an indication of failure upon each detection of the strain meeting or exceeding the threshold strain. In some embodiments, the controller 18 may be configured to provide an indication of failure upon (e.g., only upon) detection of the strain meeting or exceeding the threshold strain for more than a threshold period of time (e.g., 3, 5, 10, 30, 60, 120, 300 seconds or more).

The threshold strain may be established based on modeled data, empirical data from other strain gauges on other fluid conduits that share similar characteristics (e.g., material, size, fluid type, connected components), and/or baseline data from the one or more stain gauges 102 coupled to the fluid conduit 14. For example, over some period of time (e.g., 12 or 24 hours) after installation or periodically (e.g., once per year) or upon a request input at the controller 18, the processor 20 may collect and analyze the baseline data from the one or more strain gauges 102 coupled to the fluid conduit 14. The baseline data may indicate that one strain gauge 102 experiences a maximum strain (e.g., each time a faucet of a sink is turned on), and the processor 20 may then set the threshold strain based on the maximum strain (e.g., to be the maximum strain or some strain above the maximum strain). Then, when the data indicates that the strain meets or exceeds the threshold strain, the controller 18 may determine that there is an unusually high strain along the fluid conduit 14 and may provide the output.

In some cases, the controller 18 may only provide the output in the event that the strain exceeds the threshold strain for longer than the threshold period of time (e.g., which may also be established based on the baseline data). In this way, normal patterns and changes in strain that occur during typical movement of the fluid through the fluid conduit 14 (e.g., when turning on and off the sink) do not trigger the output; however, abnormal patterns and/or strain measurements may trigger the output. While the examples presented herein relate to monitoring for high strain conditions along the fluid conduit 14, it should be appreciated that the sensor assembly 100 may also monitor for low strain conditions along the fluid conduit 14 as the low strain along the fluid conduit 14 may indicate leaks (e.g., upstream) and/or other abnormal fluid flow (e.g., no fluid flow) through the fluid conduit 14. In such cases, it may be advantageous to notify the user to check for leaks in upstream fluid conduits and/or to check an end component (e.g., turn on the faucet at the sink) to confirm fluid flow and/or to enable the sensor assembly 100 to monitor the strain during the fluid flow.

The sensor assembly 100 and the controller 18 may also monitor and track the strain over time. If the strain appears to be increasing or decreasing in an abnormal manner over time (e.g., too quickly), the controller 18 may provide the output. Similarly, the sensor assembly 100 and the controller 18 may compare the strain to various strain signatures that correspond to different types of failures (e.g., leaks, ruptures, freezing). For example, the various strain signatures (e.g., leaks, ruptures, freezing) may be established based on modeled data and/or empirical data from other strain gauges on other fluid conduits that share similar characteristics. The controller 18 may access the various strain signatures and compare the strain as measured by the one or more strain gauges 102 to the strain signatures. Based on a match between one or more of the various strain signatures and the strain as measured by the one or more strain gauges 102, the controller 18 may determine the type of failure in the fluid conduit 14. Then, the controller 18 may provide the output, which may indicate the type of failure in the fluid conduit 14. It should be appreciated that these techniques may also be used to predict a future failure of the fluid conduit 14, as well as the type of the future failure of the fluid conduit 14, a location of the future failure of the fluid conduit 14, and/or a time at which the future failure of the fluid conduit 14 might occur. For example, the various strain signatures may correspond to strain patterns that exist prior to rupture. Thus, if the controller 18 determines that there is a match between one or more of these strain signatures and the strain as measured by the one or more strain gauges 102, the controller 18 may predict the future failure of the fluid conduit 14 and related parameters.

Advantageously, each strain gauge 102 may be located at a respective position along the fluid conduit 14, and the data from each strain gauge 102 may be provided separately to the controller 18 in a manner that allows the controller 18 to correlate the strain to the respective position. In this way, the controller 18 may compare the data to the baseline data for each strain gauge 102, perform separate comparisons and analysis for each strain gauge 102, and/or indicate the location of unusual strain measurements to the user.

The one or more strain gauges 102 may be positioned along the outer wall of the fluid conduit 14. For example, the one or more strain gauges 102 may be adhered or otherwise fastened to the outer wall of the fluid conduit 14. In some embodiments, the strain gauges 102 may be supported by a housing (e.g., a bracket, a clamp) to facilitate coupling to the fluid conduit 14. These techniques may enable efficiently retrofitting the one or more strain gauges 102 to the fluid conduit 14.

Additionally, the one or more strain gauges 102 may be distributed (e.g., evenly spaced apart) from a first end to a second end of the fluid conduit 14, or the one or more strain gauges 102 may be placed or concentrated at certain regions of the fluid conduit 14. For example, the one or more strain gauges 102 may be placed at and/or adjacent to elbows (e.g., connectors, bends, or curves) in the fluid conduit 14. As another example, the one or more strain gauges 102 may be placed at and/or adjacent to the first end and/or the second end of the fluid conduit 14. Because elbows and ends/connections are expected to experience failures or leaks more frequently than straight sections of the fluid conduit 14, such placement may limit the number of strain gauges and processing power used to assess the condition of the fluid conduit 14.

Figure 5:
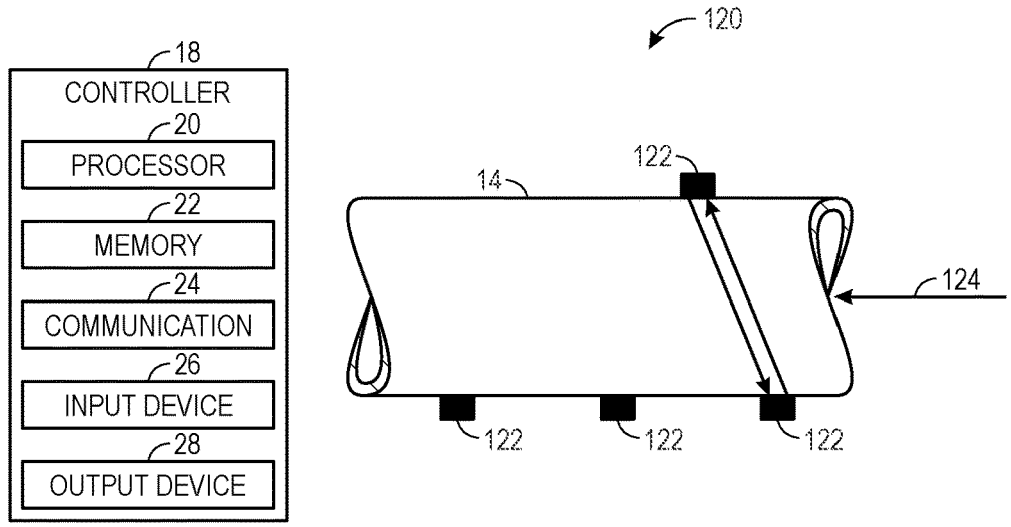
FIG. 5 illustrates a perspective view of a sensor assembly that may be utilized in the fluid conduit monitoring system of FIG. 1, wherein the sensor assembly includes acoustic sensors positioned along a fluid conduit, in accordance with embodiments described herein.

FIG. 5 illustrates a perspective view of a sensor assembly 120 that may be utilized in the fluid conduit monitoring system 10 of FIG. 1, wherein the sensor assembly 120 includes acoustic sensors 122 positioned along the fluid conduit 14, in accordance with embodiments described herein. The acoustic sensors 122 may detect acoustic waves within the fluid conduit 14 and may provide data indicative of the acoustic waves to the controller 18. The processor 20 may process the data to determine conditions along the fluid conduit 14 and to provide various outputs based on the conditions along the fluid conduit 14.

In some embodiments, the acoustic sensors 122 may operate as a flow meter (e.g., flow rate detector). In such cases, the acoustic sensors 122 may include a transmitter-receiver pair that are positioned on opposite sides of the fluid conduit 14 (e.g., diametrically opposed). The transmitter may transmit acoustic waves, and the receiver may receive the acoustic waves. A time of flight of the acoustic waves may be affected by a flow rate of the fluid through the fluid conduit 14 (e.g., the fluid flow is indicated by arrow 124). Thus, the acoustic sensors 122 may calculate the flow rate of the fluid through the fluid conduit 14 based on the time of flight of the acoustic waves. In turn, the flow rate of the fluid through the fluid conduit 14 may provide some information related to the condition of the fluid conduit 14.

For example, a leak in the fluid conduit 14 may cause the flow rate to be greater than zero and/or to be different from a baseline flow rate. As another example, a leak within the fluid conduit 14 may cause the fluid flow to change in a particular way (e.g., one acoustic sensor 122 downstream of the leak may detect fluid flow traveling in an opposite direction to the arrow 124, while one acoustic sensor 122 upstream of the leak may detect an increase in the fluid flow rate in the direction of the arrow 124). While the acoustic sensors 122 include the transmitter-receiver pair in FIG. 5, it should be appreciated that the acoustic sensors 122 may be arranged in other ways (e.g., transmitter-receiver unit on one side of the fluid conduit 14 to detect reflected acoustic waves that are indicative of the flow rate of the fluid). Indeed, any flow meter may be utilized in the present embodiments.

In some embodiments, the processor 20 may compare the flow rate to a threshold flow rate. The controller 18 may provide an indication of failure upon each detection of the flow rate meeting or exceeding the threshold flow rate. In some embodiments, the controller 18 may be configured to provide an indication of failure upon (e.g., only upon) detection of the flow rate meeting or exceeding the threshold flow rate for more than a threshold period of time (e.g., 3, 5, 10, 30, 60, 120, 300 seconds or more).

The threshold flow rate may be established based on modeled data, empirical data, and/or baseline data for the one or more acoustic sensors 122 along the fluid conduit 14. The threshold flow rate may be established in a manner similar to the threshold strain, as discussed above with respect to FIG. 4. In this way, normal patterns and changes in flow rate that occur during normal movement of the fluid through the fluid conduit 14 do not trigger the output; however, abnormal patterns and/or flow rate measurements may trigger the output. It should be appreciated that the sensor assembly 100 may monitor for both abnormally high and low flow rates along the fluid conduit 14. The sensor assembly 100 and the controller 18 may also monitor and track the flow rate over time.

Additionally, the acoustic sensors 122 may detect acoustic waves generated within the fluid conduit 14 due to opening and closing valves along the fluid conduit 14, leaks within the fluid conduit 14, ruptures along the fluid conduit 14, bending along the fluid conduit 14 (e.g., buckling of the fluid conduit 14). For example, a rupture may generate an acoustic wave with particular characteristics, which may be recognized by the controller 18 (e.g., by comparing to acoustic signatures). The controller 18 may compare the acoustic waves to various acoustic signatures that correspond to different types of failures (e.g., leaks, ruptures, freezing). The determination and/or prediction of the types of failures, and corresponding parameters, may be determined in a similar manner as discussed above with respect to FIG. 5. Furthermore, the output may be provided in a similar manner as discussed above with respect to FIG. 5.

Advantageously, each acoustic sensor 122 may be located at a respective position along the fluid conduit 14, and the data from each acoustic sensor 122 may be provided separately to the controller 18 in a manner that allows the controller 18 to correlate the acoustic waves to the respective position. In this way, the controller 18 may compare the data to the baseline data for each acoustic sensor 122, perform separate comparisons and analysis for each acoustic sensor 122, and/or indicate the location of unusual acoustic waves to the user.

The one or more acoustic sensors 122 may be positioned along the outer wall of the fluid conduit 14. For example, the one or more acoustic sensors 122 may be adhered or otherwise fastened to the outer wall of the fluid conduit 14. In some embodiments, the acoustic sensors 122 may be supported by a housing (e.g., a bracket, a clamp) to facilitate coupling to the fluid conduit 14. These techniques may enable efficiently retrofitting the one or more acoustic sensors 122 to the fluid conduit 14. Additionally, the one or more acoustic sensors 122 may be distributed (e.g., evenly spaced apart) from a first end to a second end of the fluid conduit 14, or the one or more acoustic sensors 122 may be placed or concentrated at certain regions of the fluid conduit 14 (e.g., at elbows, connectors, bends, curves, ends) in the fluid conduit 14.

Figure 6:
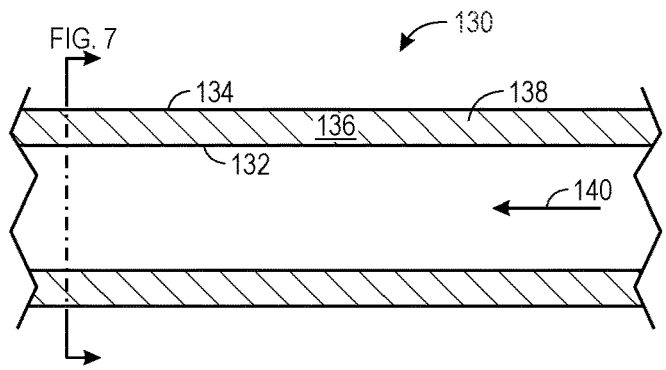
FIG. 6 illustrates a cross-sectional side view of a fluid conduit that includes an inner wall and an outer wall that define an annular space that supports a fluid-activated material, in accordance with embodiments described herein.
Figure 7:
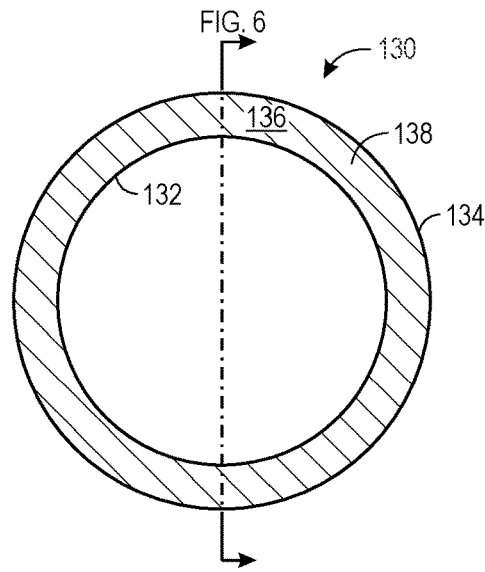
FIG. 7 illustrates a cross-sectional front view of the fluid conduit of FIG. 6, in accordance with embodiments described herein.

FIG. 6 illustrates a cross-sectional side view of a fluid conduit 130 that includes an inner wall 132 (e.g., radially-inner annular wall) and an outer wall 134 (e.g., radially-outer annular wall) that define an annular space 136 that supports a fluid-activated material 138, in accordance with embodiments described herein. FIG. 7 illustrates a cross-sectional front view of the fluid conduit 130 of FIG. 6, in accordance with embodiments described herein.

The fluid conduit 130 may be utilized in place of the fluid conduit 14 or in conjunction with the fluid conduit 14. For example, certain portions of a fluid conduit may include single-walled sections (e.g., like the fluid conduit 14) and other portions of the fluid conduit may include double-walled sections (e.g., like the fluid conduit 130). In any case, the inner wall 132 defines a central passage (e.g., bore) that supports a fluid flow, as indicated by arrow 140. When the inner wall 132 develops a leak (e.g., due to freezing fluid or wear), the fluid travels across the inner wall 132 to mix with the fluid-activated material 138 within the annular space 136. Upon mixing with the fluid, the fluid-activated material 138 may change state (e.g., harden or solidify) to block the flow of the fluid across the inner wall 132 and/or otherwise interact with the fluid (e.g., absorb the fluid) to reduce a volume of the fluid that travels across the inner wall 132. For example, the fluid-activated material 138 may be an aggregate material in powder form or liquid form that hardens (or otherwise changes state) upon exposure to the fluid, a fabric material that hardens upon exposure to the fluid, a polymer material (e.g., sodium polyacrylate; sponges) that expands upon exposure to the fluid and/or absorbs the fluid, or the like.

Furthermore, the outer wall 134 also provides an additional barrier and containment for the fluid within the fluid conduit 130. However, even in the event of the leak extending across both the inner wall 132 and the outer wall 134, the fluid-activated material 138 may mix with the fluid in a manner that blocks fluid flow out of the fluid conduit 130 and/or improves outcomes (e.g., reduces damage to structures outside the fluid conduit 130).

It should also be appreciated that any of the sensor assemblies 12 disclosed herein may be utilized in conjunction with the fluid conduit 130 and/or the fluid-activated material 138. For example, any portion of any of the sensor assemblies 50, 80, 100, 120 may be positioned in the annular space 136. In such cases, the outer wall 134 may protect the sensor assemblies 50, 80, 100, 120 from impact or damage from external sources (e.g., weather, such as rain; interference from animals or people). However, it should be appreciated that the sensor assemblies 50, 80, 100, 120 may also be positioned outside of the outer wall 134. Additionally, the sensor assemblies 50, 80, 100, 120 may be configured to detect the change in the fluid-activating material 138. For example, as the fluid-activating material 138 hardens and/or expands within the annular space 136, the strain on the fluid conduit 130 may change (e.g., in a predictable manner that corresponds to a strain signature) and/or the acoustic waves may change (e.g., in a predictable manner that corresponds to an acoustic signature). Thus, the controller 18 may detect the change in the fluid-activating material 138 and provide a relevant output, such as to notify the user that the fluid-activating material 128 has been activated and that there is a leak along the fluid conduit 130 and/or to control a valve.

It should also be appreciated that the sensor assemblies 50, 80, 100, 120 may be used together in any of a variety of ways to provide more accurate, reliable monitoring of the condition of the fluid conduit 14 (or the fluid conduit 130). For example, the sensor assembly 50 and/or the sensor assembly 80 may be utilized in combination with the sensor assembly 100 and/or the sensor assembly 120. As a more specific example, when the sensor assembly 50 and/or the sensor assembly 80 detects the presence of the fluid and the sensor assembly 100 detects changes in the strain along the fluid conduit 14 that correspond to a leak (e.g., based on comparison to the threshold strain and/or strain signatures), the controller 18 may determine that there is a leak in the fluid conduit 14 and may provide the output (e.g., to notify the user and/or to control a valve). As another more specific example, when the sensor assembly 50 and/or the sensor assembly 80 detects the presence of the fluid and the sensor assembly 100 has previously detected prior changes in the strain along the fluid conduit 14 that indicated that a leak was likely to occur along the fluid conduit 14 (e.g., based on comparison to the strain signatures), the controller 18 may determine that there is a leak in the fluid conduit 14 and may provide the output (e.g., to notify the user and/or to control a valve).

In some cases, the controller 18 may only provide the output in the event that at least two different sensor assemblies indicate the leak, or the controller 18 may provide different levels of alerts based on the number of sensor assemblies that indicate the leak. For example, if only one sensor assembly indicates the leak, the controller 18 may provide a first, lower-level alert (e.g., a yellow light indicator, a first alarm sound, and/or a first text message). However, if two sensor assemblies indicate the leak, then the controller 18 provides a second, higher-level alert (e.g., a red light indicator, a second alarm sound, and/or a second text message).

The disclosed embodiments provide the technical effect of detecting fluid conduit failure (e.g., bends, leaks, ruptures). Advantageously, the disclosed embodiments reduce the occurrence and/or damage (e.g., secondary damage) caused by leaks or ruptures in fluid conduits. For example, by monitoring the condition of the fluid conduit(s) via one or more sensor assemblies and providing a relevant output (e.g., a notification to a user and/or a control signal to a valve), the fluid conduit monitoring system may facilitate preventive maintenance and/or corrective actions. In some embodiments, use of one or more of the sensor assemblies disclosed herein within a property (e.g., a building, a vehicle) may affect an insurance cost (e.g., deductible and/or premium) for the property. For example, the insurance cost may be lower with the use of one or more of the sensor assemblies (e.g., as compared to without use of one or more of the sensor assemblies). The controller may provide signals to another controller (e.g., insurance provider computer system having one or more processors) to indicate the use of one or more sensor assemblies at the property, and the another controller may then adjust the insurance cost.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. It should be appreciated that any of the features shown or described with respect to FIGS. 1-7 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system configured to monitor a condition of a fluid conduit that supports a flow of a fluid, the system comprising:
 a leak detection sensor assembly comprising a first electrical conductor and a second electrical conductor positioned on the fluid conduit;
 one or more strain gauges positioned on the fluid conduit; and
 a controller configured to determine a presence of a leak of the fluid along the fluid conduit in response to:
  a resistance of a leak detection electrical circuit formed by the first electrical conductor and the second electrical conductor indicating that the leak detection electrical circuit is closed; and
  data from the one or more strain gauges indicating the presence of the leak of the fluid along the fluid conduit corresponding to one or more strain signatures indicative of a strain pattern, wherein the one or more strain gauges are positioned at one or more bends of the fluid conduit.

2. The system of claim 1, comprising a fluid-absorbing member positioned between the first electrical conductor and the second electrical conductor, wherein the fluid-absorbing member is configured to absorb the fluid to close the leak detection electrical circuit.

3. The system of claim 1, wherein the controller is configured to calculate a measurement based on the data from the one or more strain gauges, compare the measurement to a threshold, and determine that the data indicates the presence of the leak along the fluid conduit in response to the measurement meeting or exceeding the threshold.

4. The system of claim 3, wherein the threshold is one or more baseline strain signatures.

5. The system of claim 1, wherein the controller is configured to provide a control signal to close a valve in response to determining the presence of the leak along the fluid conduit.

6. The system of claim 1, wherein the controller is configured to instruct an output device to provide an audible alert or a visible alert in response to determining the presence of the leak along the fluid conduit.

7. The system of claim 1, wherein the fluid conduit comprises an inner annular wall, an outer annular wall, an annular space defined between the inner annular wall and the outer annular wall, and a fluid-activated material in the annular space.

8. The system of claim 7, wherein the fluid-activated material is configured to change state, to interact with the fluid when exposed to the fluid, or both to block travel of the fluid across the inner annular wall.

9. The system of claim 1, wherein the fluid conduit comprises a rigid pipe.

10. The system of claim 1, wherein the fluid conduit comprises an inner annular wall, an outer annular wall, an annular space defined between the inner annular wall and the outer annular wall, and the leak detection sensor assembly in the annular space.

11. The system of claim 1, wherein the bend comprises an elbow connected to a straight portion of the fluid conduit.

12. The system of claim 11, wherein a first number of the one or more strain gauges are positioned on the elbow and a second number of the one or more strain gauges are positioned on the straight portion of the fluid conduit, and wherein the first number is greater than the second number.

13. A system configured to monitor a plurality of fluid conduits that each support a flow of a fluid associated with a structure, the system comprising:
   a plurality of sensor assemblies positioned on the plurality of fluid conduits, wherein the plurality of sensor assemblies comprises one or more strain gauges, and wherein the one or more strain gauges are positioned at one or more bends of the plurality of fluid conduits; and
   a controller configured to:
      determine a presence of a leak of the fluid along the plurality of fluid conduits based on data from the plurality of sensor assemblies corresponding to one or more strain signatures indicative of a strain pattern; and
      in response to determining the presence of the leak of the fluid, provide an output to a display screen, a speaker, a valve, or any combination thereof.

14. The system of claim 13, wherein the controller is configured to calculate a measurement based on the data from the one or more strain gauges, compare the measurement to a threshold strain signature, and determine that the data indicates the presence of the leak along the plurality of fluid conduits in response to the measurement being below the threshold strain signature.

15. The system of claim 14, wherein the controller is configured to:
   determine that the data indicates a respective presence of a high strain condition in response to the measurement meeting or exceeding the threshold strain signature for a threshold period of time; and
   in response to determining the presence of the high strain condition, provide a respective output to the display screen, the speaker, the valve, or any combination thereof.

16. The system of claim 13, wherein the plurality of sensor assemblies comprises one or more leak detection sensor assemblies, and each leak detection sensor assembly of the one or more leak detection sensor assemblies comprises a first electrical conductor and a second electrical conductor.

17. The system of claim 13, wherein the plurality of fluid conduits comprises a plurality of rigid pipes.

18. A method of monitoring a condition of a fluid conduit that supports a flow of fluid, the method comprising:
   receiving, at one or more processors, data from one or more strain gauges positioned on the fluid conduit;
   determining, using the one or more processors, a presence of a leak of the fluid or a failure condition along the fluid conduit based on data from the one or more strain gauges corresponding to one or more strain signatures indicative of a strain pattern, wherein the one or more strain gauges are positioned at one or more bends of the fluid conduit; and
   instructing, using the one or more processors, an output via a display screen, a speaker, a valve, or any combination thereof in response to determining the presence of the leak of the fluid or the failure condition.

19. The method of claim 18, comprising:
   receiving, at one or more processors, additional data from one or more leak detection assemblies positioned on the fluid conduit, wherein each leak detection sensor assembly of the one or more leak detection sensor assemblies comprises a first electrical conductor and a second electrical conductor; and
   determining, using the one or more processors, the presence of the leak along the fluid conduit based on data from the one or more strain gauges and the additional data from the one or more leak detection assemblies.

20. The method of claim 18, comprising determining, using the one or more processors, the failure condition along the fluid conduit in response to the data from the one or more strain gauges meeting or exceeding a threshold strain signature for at least a threshold period of time.

\* \* \* \* \*